UNITED STATES PATENT OFFICE.

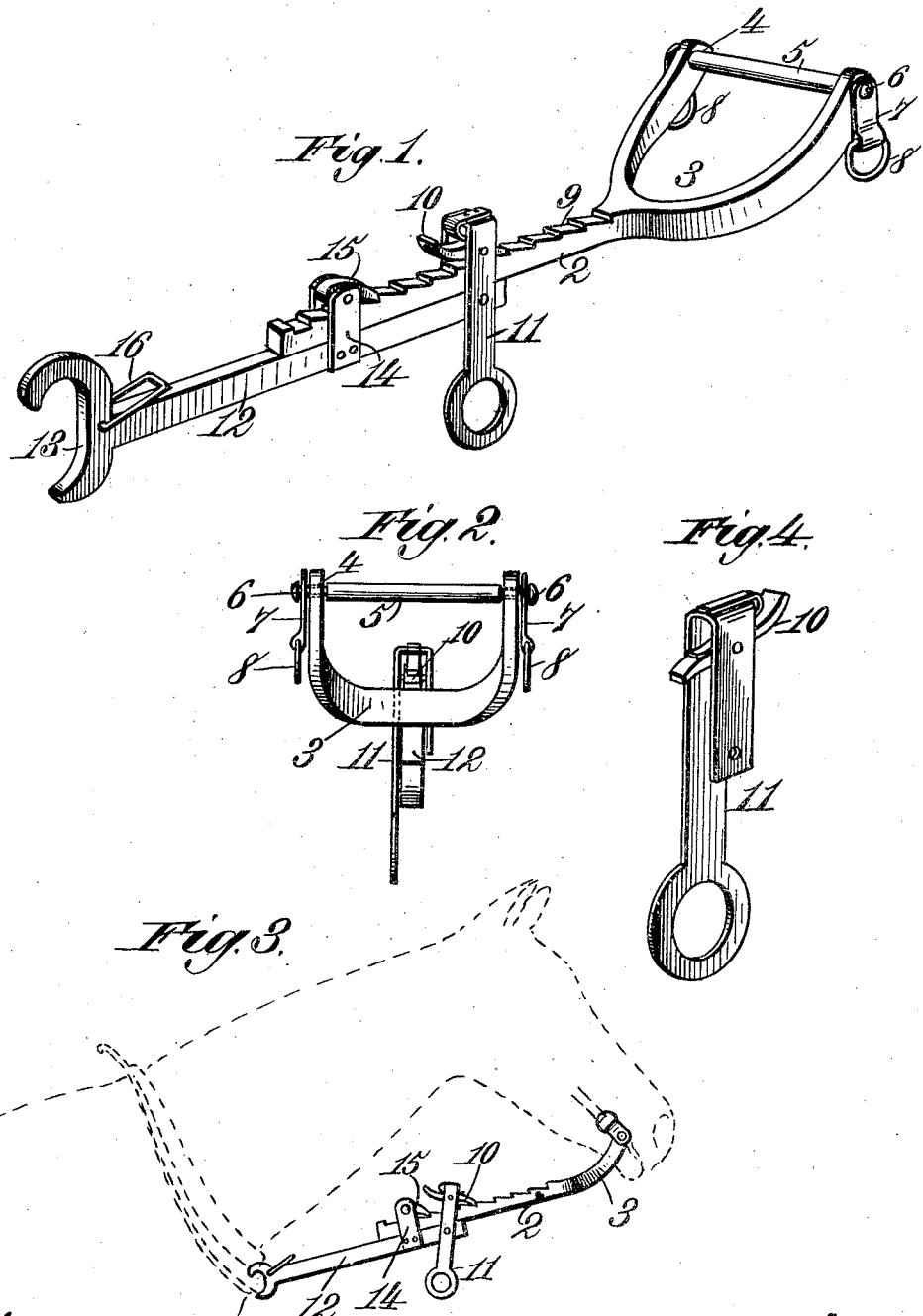

THOMAS E. JENKINS, OF AMARILLO, TEXAS, ASSIGNOR, BY MESNE ASSIGNMENTS, OF ONE-HALF TO BERT O. CATOR, OF HANSFORD, TEXAS.

VETERINARY-TOOL.

No. 893,589.    Specification of Letters Patent.    Patented July 14, 1908.

Application filed July 14, 1906. Serial No. 326,221.

*To all whom it may concern:*

Be it known that I, THOMAS E. JENKINS, a citizen of the United States, residing at Amarillo, in the county of Potter and State of Texas, have invented new and useful Improvements in Veterinary-Tools, of which the following is a specification.

The invention relates to a veterinary tool, and more particularly to that class of tools for use with animals to elevate their heads for the purpose of drenching, floating or treating the teeth in the mouth of the animal.

The primary object of the invention is the provision of means for adjusting or elevating the head of an animal for treatment.

A further object of the invention is the provision of means for holding the tool in an adjusted position.

A still further object of the invention is the provision of means for automatically adjusting the tool to lengthen the same and also to hold such tool in an adjusted position.

Another object of the invention is the provision of two slidable elements, one carried by the other and capable of being automatically adjusted with respect to each other and be released.

Other objects of the invention is the provision of means simple in construction, durable, efficient and inexpensive in the manufacture.

With these and other objects in view the invention consists in the construction, combination and arrangement of parts as will be hereinafter referred to and as embodied in the accompanying drawings which illustrate the preferable form of the invention; however, the same may be varied, modified, or slightly changed as come properly within the scope of the claims hereunto appended.

In the drawings:—Figure 1 is a perspective elevation of the tool; Fig. 2 is a front view thereof; Fig. 3 is a view of the tool in position on the animal and connected to the collar of the harness, the latter being of the ordinary construction and forming no part of the invention; Fig. 4 is a view of the actuating lever having the spring controlled pawl, the same being detached from the tool.

Similar reference characters indicate corresponding parts throughout the several views.

In the drawings, the numeral 2 designates a primary member having a forked extremity 3, the latter being curved and having openings 4 adjacent to the terminals thereof for receiving a roller or bit element 5, the latter detachably connected and rotatably supported by any suitable fastenings, such as detachable pins 6. Carried by the pins 6 and at opposite sides of the forked extremity 3 are loops 7 having rings 8 so that the bit 5 carried by the forked extremity 3 can be held in the mouth of the animal by the rings 8 being connected to the bridle or halter of any ordinary or well known construction. The primary member 2 at one edge thereof is provided with a plurality of teeth 9 forming a rack engaged by a spring controlled pawl 10 supported by a rocking lever 11 pivotally connected to a secondary member 12, the latter having at one end thereof a hook terminal 13 engageable with the body of the collar worn by the animal and the same being of any construction as it forms no part of the invention. Said member 2 is adapted to slide between plates 14 fixed at opposite sides of the member 12 and in alinement with one another. Pivotally connected to the plates 14 is a hand operable pawl 15 adapted to engage the teeth 9 forming the rack for holding the said member 2 in a locked position with respect to the secondary member 12. Said member 2 is adapted to be actuated by the spring controlled pawl 10 engaging the teeth 9; and by actuating the lever 11 causes said member 2 to slidably move longitudinally of the secondary member 12, and the movement thereof will be step-by-step as the pawl 10 engages successively the teeth 9. To decrease the longitudinal extent of the members 2 and 12, it is only necessary to actuate the pawl 10 to release the same from engagement with the teeth 9 of the member 2 and also to release the pawl 15, and the said primary member 2 will then be free to move, so as to shorten the length of the tool.

The tool can be made of any suitable material. However, it is preferably made of metal.

For holding the member 2 and secondary member 12 normally against movement is provided a loop 16 carried near the hooked terminal 13 of the member 12 and engageable with the free terminal of the member 2, thereby locking the same against movement.

It will be apparent that the tool when properly adjusted and applied to an animal will hold the same incapable of violent struggling which might injure the attendant; and furthermore, the said tool is exceedingly valuable when adapted for blacksmiths while shoeing the animals. Also for horse breakers while harnessing the stock.

Having thus described the invention, what is claimed as new, is:—

1. A tool of the class described comprising a primary and secondary member, said primary member having a forked extremity, a bit mounted between the fork, loops connected to opposite ends of the bit, a hook extremity at one end of the secondary member, and a hand-operable member carried by the secondary member and for engagement with the primary member to adjust said members with respect to each other.

2. A tool of the class described comprising superimposed members adjustable with respect to each other, a fork formed at one extremity of one of the members, a bit mounted within the forked extremity, loop elements carried by the said bit for securing the device to the head of an animal, a hook at one end of the other member, plates carried by one of the members, a pawl supported by said plates, one of said members having rack teeth adapted to be engaged by the pawl to hold the members in their adjusted position, a hand-operable lever pivotally connected to the lowermost member, a pawl carried by said lever, and a spring interposed between the lever and said pawl to hold the latter normally in engagement with the rack teeth.

3. A tool of the class described comprising a member having a hook extremity, a member having a forked extremity, each of said members slidably associated, rack teeth formed in the forked member, a rocking lever bent on itself to form a loop and pivotally connected to the member having the hook extremity, a spring controlled pawl mounted within the loop and normally in engagement with the rack teeth of the forked member, means carried by the member having the hook extremity and engageable with the other member to hold the same against movement, and a bit mounted in the fork.

4. In a tool of the class described, a pair of members associated to slide upon each other, hand-operable means carried by one of the members and engageable with the other member for imparting sliding movement thereto in one direction, means for releasing said hand-operable means, a pawl carried by one of the members and in engagement with the other member to hold the latter against backward movement while the same is being actuated by the hand-operable means, a bit carried by one of the members, and a hook carried by the remaining member.

5. A tool of the class described comprising a primary and secondary member longitudinally extensible with respect to each other, means carried by the secondary member and engageable with the primary member to extend the latter with respect to the secondary member, and means also associated with the secondary member and in engagement with the primary member to prevent the latter from moving backward in a direction opposite to the extension of the same by the first mentioned means.

6. A tool of the class described comprising a primary and secondary member longitudinally extensible with respect to each other, means carried by the secondary member and engageable with the primary member to extend the latter with respect to the secondary member, means also associated with the secondary member and in engagement with the primary member to prevent the latter from moving backward in a direction opposite to the extension of the same by the first mentioned means, means on the secondary member for engagement with the harness of an animal, and means on the primary member for engagement with the mouth of the animal to hold the members in operative position.

In testimony whereof I have hereunto set my hand in presence of two subscribing witnesses.

THOMAS E. JENKINS.

Witnesses:
J. B. HILDEBRAND,
H. H. COOPER.